(12) United States Patent
Johnson et al.

(10) Patent No.: US 10,223,856 B2
(45) Date of Patent: Mar. 5, 2019

(54) SELF-AUTHENTICATING CREDIT CARD SYSTEM

(75) Inventors: Simon B. Johnson, Bonney Lake, WA (US); Lev M. Bolotin, Kirkland, WA (US)

(73) Assignee: ClevX, LLC, Kirkland, WA (US)

( * ) Notice: Subject to any disclaimer, the term of this patent is extended or adjusted under 35 U.S.C. 154(b) by 0 days.

(21) Appl. No.: 12/680,549

(22) PCT Filed: Sep. 26, 2008

(86) PCT No.: PCT/US2008/077765
§ 371 (c)(1),
(2), (4) Date: Mar. 26, 2010

(87) PCT Pub. No.: WO2009/042819
PCT Pub. Date: Apr. 2, 2009

(65) Prior Publication Data
US 2010/0230487 A1    Sep. 16, 2010

Related U.S. Application Data

(60) Provisional application No. 60/975,356, filed on Sep. 26, 2007.

(51) Int. Cl.
*G06K 7/00* (2006.01)
*G07F 7/10* (2006.01)
(Continued)

(52) U.S. Cl.
CPC ....... *G07F 7/1008* (2013.01); *G06Q 20/3415* (2013.01); *G07F 7/10* (2013.01);
(Continued)

(58) Field of Classification Search
USPC .... 235/375, 379, 380, 487, 492, 494; 705/5, 705/35–45
See application file for complete search history.

(56) References Cited

U.S. PATENT DOCUMENTS

| | | |
|---|---|---|
| 3,624,938 A | 12/1971 | George |
| 4,408,119 A | 10/1983 | Decavele |
| (Continued) | | |

FOREIGN PATENT DOCUMENTS

| | | |
|---|---|---|
| KR | 20020045187 A | 6/2002 |
| KR | 20030033888 A | 5/2003 |
| (Continued) | | |

OTHER PUBLICATIONS

International Search Report for International application No. PCT/US2008/077765.
(Continued)

*Primary Examiner* — Matthew Mikels
(74) *Attorney, Agent, or Firm* — Schwegman Lundberg & Woessner, P.A.

(57) ABSTRACT

A self-authenticating credit card method includes: inputting a unique identification to an input device on a credit card; comparing the input unique identification with a stored unique identification stored within the credit card; and providing an output from the credit card when the received unique identification matches the unique identification stored within the credit card.

19 Claims, 7 Drawing Sheets

(51) Int. Cl.
*G06Q 20/34* (2012.01)
*G07F 7/12* (2006.01)

(52) U.S. Cl.
CPC .......... *G07F 7/1025* (2013.01); *G07F 7/1083* (2013.01); *G07F 7/125* (2013.01)

(56) References Cited

U.S. PATENT DOCUMENTS

| | | | |
|---|---|---|---|
| 5,623,552 A | | 4/1997 | Lane |
| 6,257,486 B1* | | 7/2001 | Teicher ............... G06K 7/0021 235/380 |
| 6,954,133 B2* | | 10/2005 | McGregor et al. .......... 340/5.26 |
| 7,069,447 B1 | | 6/2006 | Corder |
| 8,832,440 B2 | | 9/2014 | Johnson et al. |
| 9,075,571 B2 | | 7/2015 | Bolotin et al. |
| 9,262,611 B2 | | 2/2016 | Johnson et al. |
| 2001/0034717 A1* | | 10/2001 | Whitworth ........... G06Q 20/341 705/64 |
| 2002/0153424 A1* | | 10/2002 | Li .................... G06K 19/06206 235/492 |
| 2003/0075610 A1* | | 4/2003 | Ong ....................... G06K 19/07 235/492 |
| 2003/0085286 A1* | | 5/2003 | Kelley ................. G06K 19/073 235/492 |
| 2003/0177347 A1 | | 9/2003 | Schneier et al. |
| 2005/0086471 A1* | | 4/2005 | Spencer ............... H04L 9/0894 713/165 |
| 2006/0213972 A1* | | 9/2006 | Kelley et al. ................. 235/380 |
| 2007/0214093 A1 | | 9/2007 | Colella |
| 2008/0029607 A1* | | 2/2008 | Mullen ............... G06K 19/077 235/492 |
| 2014/0195441 A1 | | 7/2014 | Johnson |
| 2016/0119339 A1 | | 4/2016 | Bolotin et al. |
| 2016/0259736 A1 | | 9/2016 | Bolotin et al. |

FOREIGN PATENT DOCUMENTS

| | | |
|---|---|---|
| TW | 200915235 | 4/2009 |
| WO | 88/09019 | 11/1988 |
| WO | 01/61640 A1 | 8/2001 |
| WO | 2007/057603 A1 | 5/2007 |
| WO | WO-2009042819 | 4/2009 |

OTHER PUBLICATIONS

"U.S. Appl. No. 13/734,653, Advisory Action dated Jul. 15, 2016", 3 pgs.

"U.S. Appl. No. 13/734,653, Final Office Action dated Apr. 13, 2016", 18 pgs.

"U.S. Appl. No. 13/734,653, Non Final Office Action dated Feb. 10, 2017", 26 pgs.

"U.S. Appl. No. 13/734,653, Non Final Office Action dated Aug. 20, 2015", 16 pgs.

"U.S. Appl. No. 13/734,653, Response filed May 10, 2017 to Non Final Office Action dated Feb. 10, 2017", 15 pgs.

"U.S. Appl. No. 13/734,653, Response filed Jun. 13, 2016 to Final Office Action dated Apr. 13, 2016", 8 pgs.

"U.S. Appl. No. 13/734,653, Response filed Nov. 19, 2015 to Non Final Office Action dated Aug. 20, 2015", 16 pgs.

"International Application Serial No. PCT/US2008/077765, International Preliminary Report on Patentability dated Mar. 30, 2010", 5 pgs.

"International Application Serial No. PCT/US2008/077765, Written Opinion dated Mar. 31, 2009", 4 pgs.

"U.S. Appl. No. 13/734,653, Non Final Office Action dated Feb. 9, 2018", 29 pgs.

"U.S. Appl. No. 13/734,653, Response filed Dec. 21, 2017 to Final Office Action dated Sep. 21, 2017", 21 pgs.

"U.S. Appl. No. 13/734,653, Examiner Interview Summary dated Jun. 25, 2018", 3 pgs.

"U.S. Appl. No. 13/734,653, Response filed Jul. 5, 2018 to Non Final Office Action dated Feb. 9, 2018", 21 pgs.

\* cited by examiner

SELF-AUTHENTICATING CREDIT CARD SYSTEM

TECHNICAL FIELD

The present invention relates generally to fraudulent credit card use, and more particularly, to a method and apparatus for minimizing credit card fraud while decreasing the transaction time associated with credit card purchases in retail outlets.

BACKGROUND ART

Credit cards are ubiquitous with monetary transactions. Credit cards are used in a number of scenarios to purchase groceries, restaurant meals, retail products, on-line products, gas, or just about anything. Most often a cash or check transaction can be replaced a credit card transaction.

False charges create a tremendous burden on financial institution and card holder alike. A lost or stolen card can easily be used by an unauthorized user to make purchases. Within several hours of obtaining a lost or stolen card, a thief can fraudulently charge thousands of dollars before a notification process can stop use of the card.

Some safeguard procedures have been put into place:
Verify customer signature matches that on the back of the card.
Verify customer ID matches the name on the card.
Use sophisticated buying profiles to identify a potentially unauthorized purchase or possible theft However, these safeguard procedures are not always performed at the point of sale and they can slow the checkout process and reduce productivity of overall operations. In addition, such things as gas can be purchased without customer verification and many establishments do not require a signature for purchases under $50.

Therefore, a need exists to improve the authorization process in order to reduce the number of fraudulent purchases and make a credit card transaction more efficient.

Solutions to these problems have been long sought but prior developments have not taught or suggested any solutions and, thus, solutions to these problems have long eluded those skilled in the art.

DISCLOSURE OF THE INVENTION

The present invention provides a self-authenticating credit card including: inputting a unique identification to an input device on a credit card; comparing the input unique identification with a unique identification stored within the credit card; and providing an output from the credit card when the received unique identification matches the unique identification stored within the credit card.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
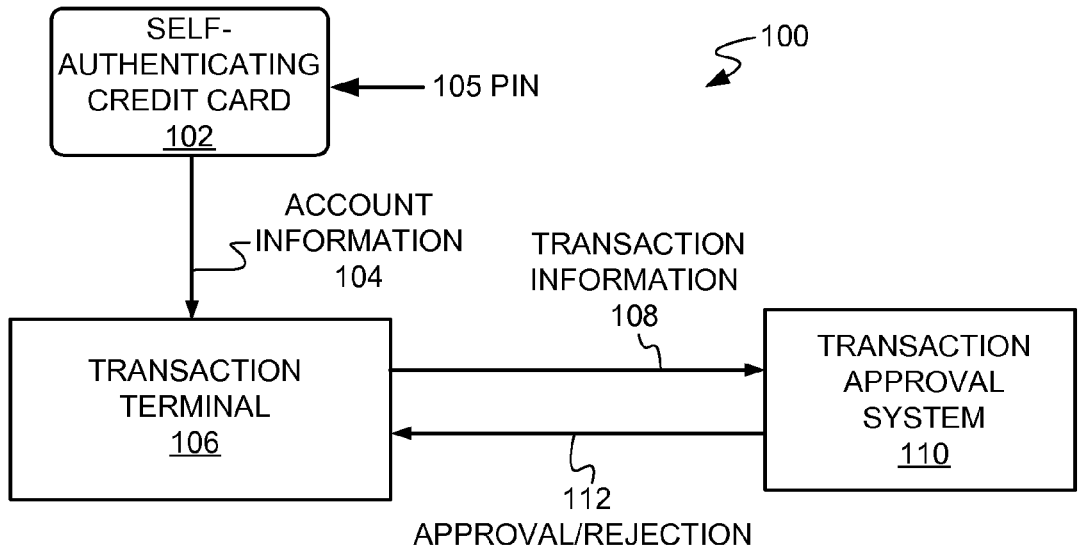
FIG. 1 shows a schematic illustration of a self-authenticating credit card system in accordance with an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown exaggerated in the drawing FIGs.

The term "system" as used herein refers to and is defined as the method and as the apparatus of the present invention in accordance with the context in which the term is used. The term "credit card" is defined to include credit cards, debit cards, identification cards, and other cards of similar size to such cards that are used for financial and/or identification purposes.

A self-authenticating credit card includes an input device for inputting alphanumeric PIN (personal identification number) by a user, a processor for controlling the operation of the credit card, a power source, and an output device for selectively transmitting account information when the user has been authenticated. A credit card user enters a personal identification number (PIN) using an input mechanism on the credit card. The received PIN is compared with an internally stored PIN. If the received sequence matches the internally stored PIN, the card is activated and credit account information is output using the output device.

Referring now to FIG. 1, therein is shown a schematic illustration of a self-authenticating credit card system 100 in accordance with an embodiment of the present invention.

A self-authenticating credit card 102 can have the same size as a conventional credit card. The self-authenticating credit card 102 contains account information 104, such as a credit card number, and requires that a unique identification 105, such as a PIN, be entered before the account information 104 is transmitted to a transaction terminal 106. If the PIN is incorrect, the account information 104 will not be transmitted.

The transaction terminal 106 receives the account information 104 and sends the account information 104 and data about the purchase in the form of transaction information 108 to an off-site transaction approval system 110. The off-site transaction approval system 110 maintains the records of transactions, charge limits, billing and accounting capabilities, etc. for supporting a conventional credit card.

An approval/rejection 112 is then relayed back from the transaction approval system 110 to the transaction terminal 106. If the approval/rejection 112 is an approval, the transaction is completed and the customer has just made a purchase.

A short time after the transaction is completed, the self-authenticating credit card 102 stops transmitting the account information 104.

As a result, the credit card user must be authenticated by the self-authenticating credit card 102 by entering a PIN before being able to make a purchase and the self-authenticating credit card 102 may be used only for a short time before requiring reentry of the PIN.

Figure 2:
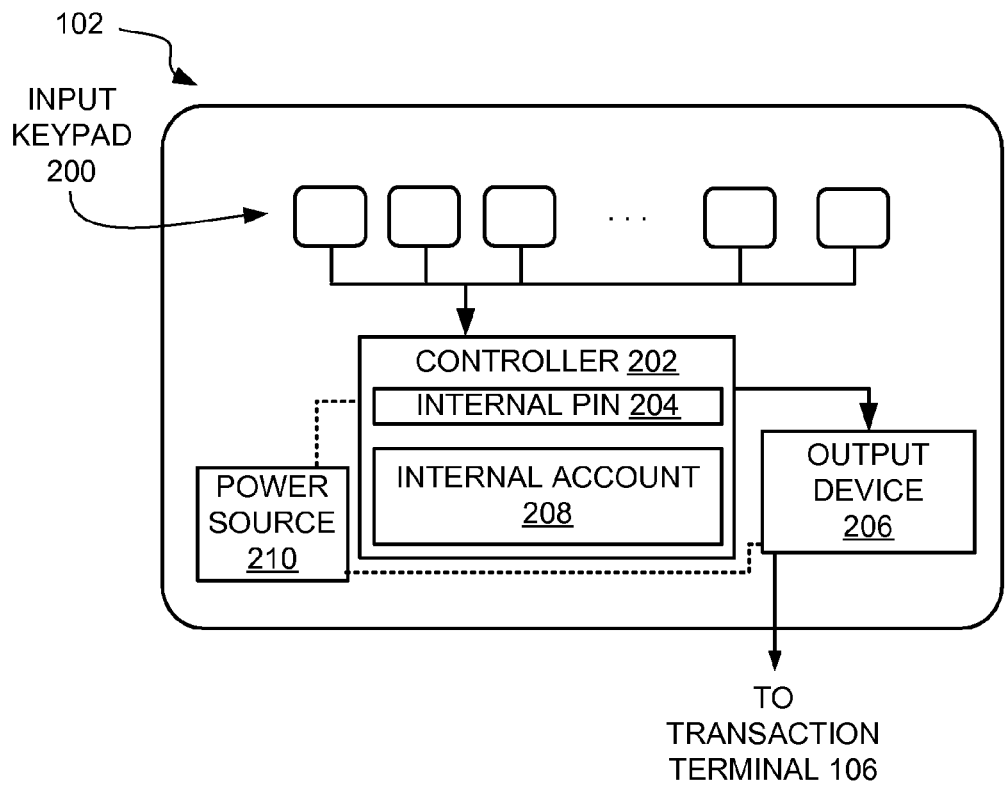
FIG. 2 shows an illustration of the self-authenticating credit card in accordance with a first embodiment of the present invention.

Referring now to FIG. 2, therein is shown an illustration of the self-authenticating credit card 102 in accordance with a first embodiment of the present invention.

The self-authenticating credit card 102 has an input device, such as an input keypad 200, for inputting a numeric, alphanumeric, or alphabetic personal identification number (PIN). The input keypad 200 can be a membrane or touch area on the self-authenticating credit card 102 supported by electronic circuitry.

A controller 202 receives the unique identification 105 of FIG. 1, the input PIN, from the input keypad 200 and authenticates the input PIN against an internal PIN, a unique identification stored in an internal PIN memory 204. If authentication does not occur, an output device 206 remains inoperative. If authentication occurs, the output device 206 opens a communication link for the transfer of the account information 104 of FIG. 1, which is one type of output in and from an internal account memory 208 to the transaction terminal 106.

To make the self-authenticating credit card 102 tamper resistant, the internal PIN memory 204 and the internal account memory 208 are within the controller 202. Many micro-controllers come equipped with a security fuse that prevents accessing any internal memory when blown. This is a well-known and widely used security feature. Such a micro-controller could be used for the controller 202. The controller 202 can be a micro-controller or microprocessor.

A self-contained power source 210, such as a battery, provides power for the self-authenticating credit card 102.

Figure 3:
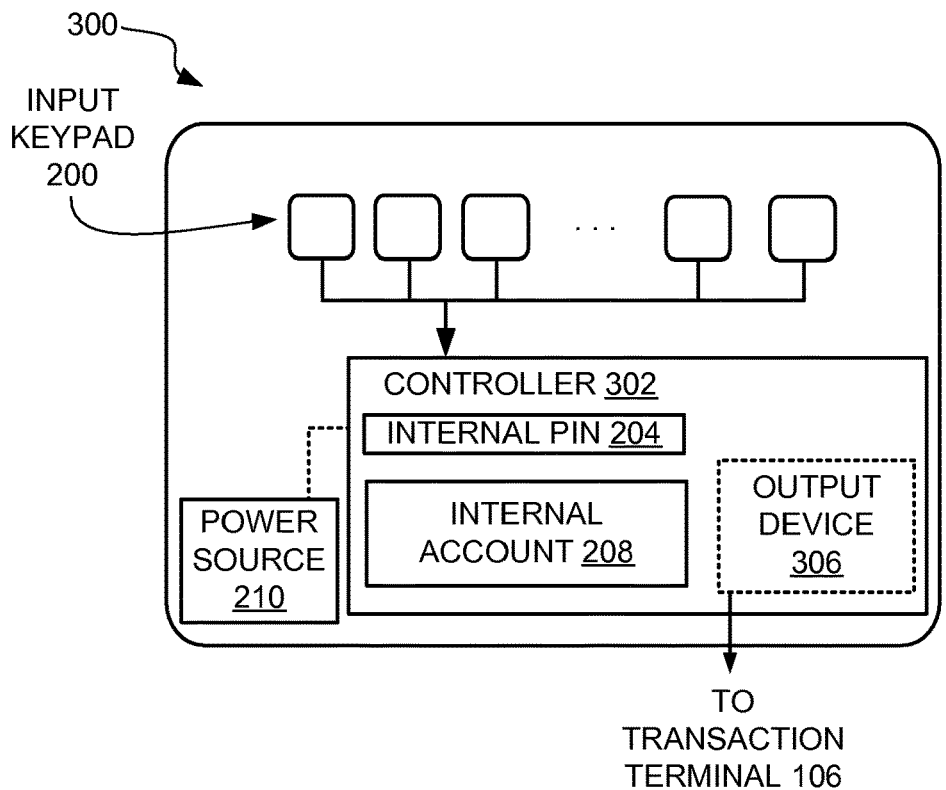
FIG. 3 shows an illustration of a self-authenticating credit card with a controller and an output device in single module in accordance with a second embodiment of the present invention.

Referring now to FIG. 3, therein is shown an illustration of a self-authenticating credit card 300 with a controller 302 and an output device 306 in single module in accordance with a second embodiment of the present invention.

An example is a radio frequency identification (RFID) module that has both the controller 302 and the output device 306 built into a single component. The output device 306 would be a RF transmitter.

The controller 302 receives an input PIN from the input keypad 200 and authenticates the input PIN against the internal PIN in the internal PIN memory 204. If authentication does not occur, the output device 306 remains inoperative. If authentication occurs, the output device 306 opens a communication link for the transfer of the account information 104 of FIG. 1 from the internal account memory 208 to the transaction terminal 106.

Figure 4:
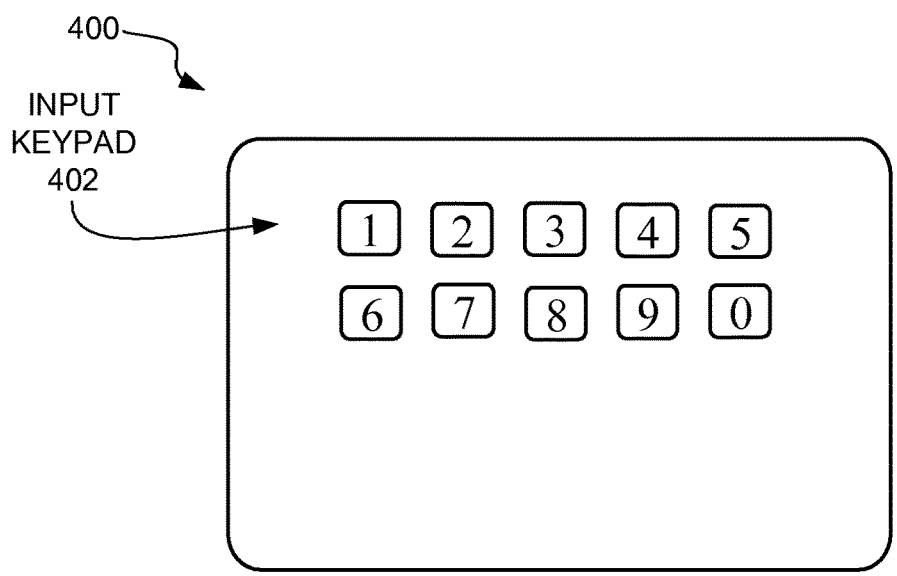
FIG. 4 shows a third embodiment of a self-authenticating credit card with an input keypad used for entering a numeric PIN.

Referring now to FIG. 4, therein is shown a third embodiment of a self-authenticating credit card 400 with an input keypad 402 used for entering a numeric PIN. A 4-digit PIN provides 10,000 unique combinations. Longer PINs provide more security. For example, a 6-digit PIN provides 1,000,000 unique combinations.

Figure 5:
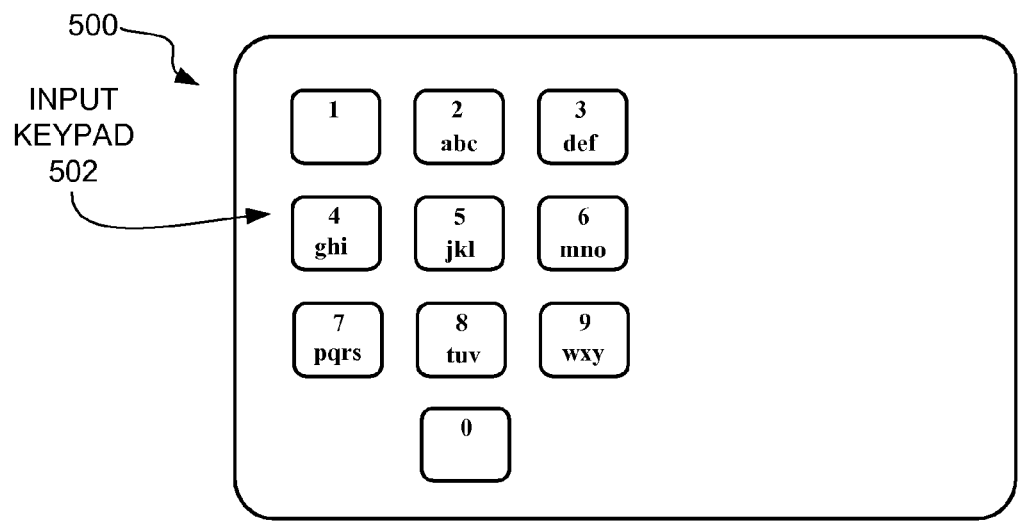
FIG. 5 shows a fourth embodiment of a self-authenticating credit card with an input keypad used for entering an alphanumeric PIN.

Referring now to FIG. 5, therein is shown a fourth embodiment of a self-authenticating credit card 500 with an input keypad 502 used for entering an alphanumeric PIN. The alphanumeric PIN provides the ability to create a PIN that is relatively long but is easy to remember, such as the acquisition date and name of a favorite toy.

Figure 6:
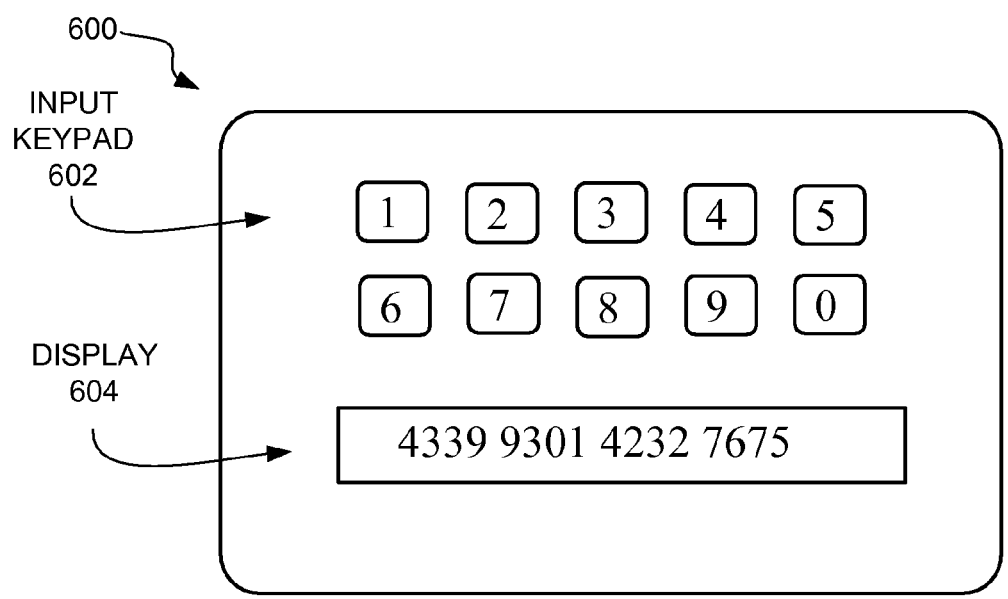
FIG. 6 shows a fifth embodiment of a self-authenticating credit card with an input keypad and a display.

Referring now to FIG. 6, therein is shown a fifth embodiment of a self-authenticating credit card 600 with an input keypad 602 and a display 604.

In some instances, credit card fraud can be committed without needing to be in possession of the card. Account information can be obtained by simply reading a conventional credit card.

The display 604 allows account information to remain hidden until the user has been authenticated by entering the validating PIN at the input keypad 602. The user may then visually reference the account information on the display 604 for performing the purchase. The purchase would be on-line or by phone.

The display 604 would be a thin display, such as a liquid crystal display (LCD).

Figure 7:
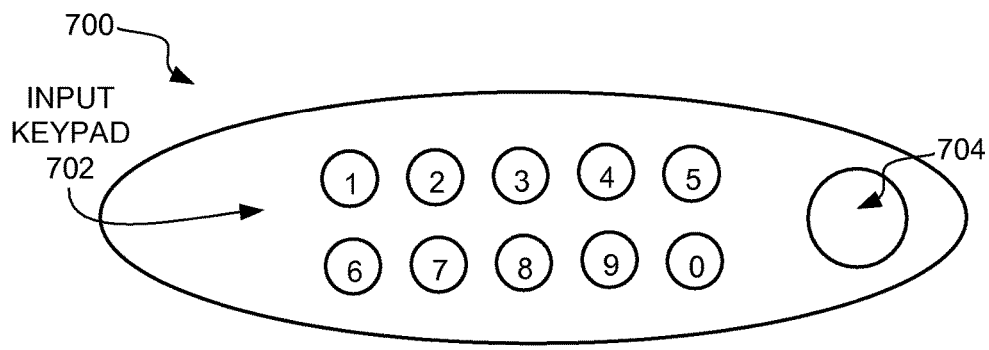
FIG. 7 shows a sixth embodiment of a self-authenticating credit card in the form of a key-chain type fob.

Referring now to FIG. 7, therein is shown a sixth embodiment of a self-authenticating credit card 700 in the form of a key-chain type fob. Key fobs are becoming increasingly popular with near field and RFID type communication interfaces for credit transactions.

The self-authenticating credit card 700 has an oval shape with keychain opening 704 and has a push button input keypad 702.

Figure 8:
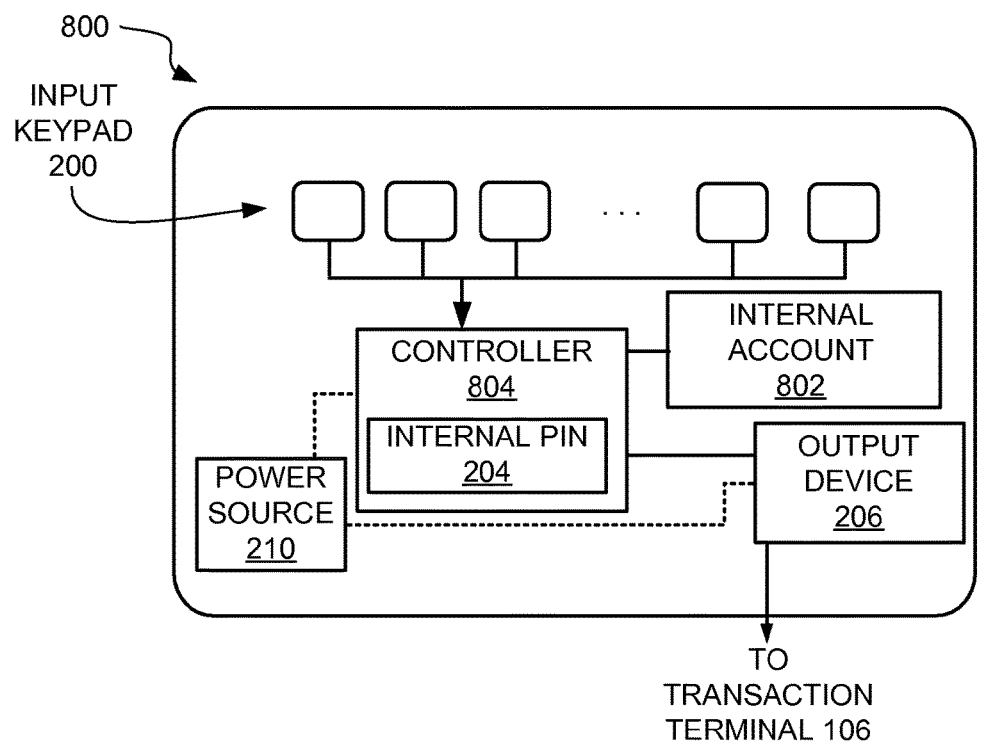
FIG. 8 shows a seventh embodiment of a self-authenticating credit card where account data is stored in a memory module external to a controller.

Referring now to FIG. 8, therein is shown a seventh embodiment of a self-authenticating credit card 800 where account data 802 is stored in a memory module external to a controller 804.

Account data may exist as clear text or be encrypted to hinder tampering. In the encrypted state, an input PIN is used to decrypt the data.

With a Flash drive, the input PIN can be used to retrieve an encryption key, which in turn, is used to decipher account data.

The controller 804 is programmed to allow a user having the internal PIN to change the internal PIN stored in the internal PIN memory 204.

Figure 9:
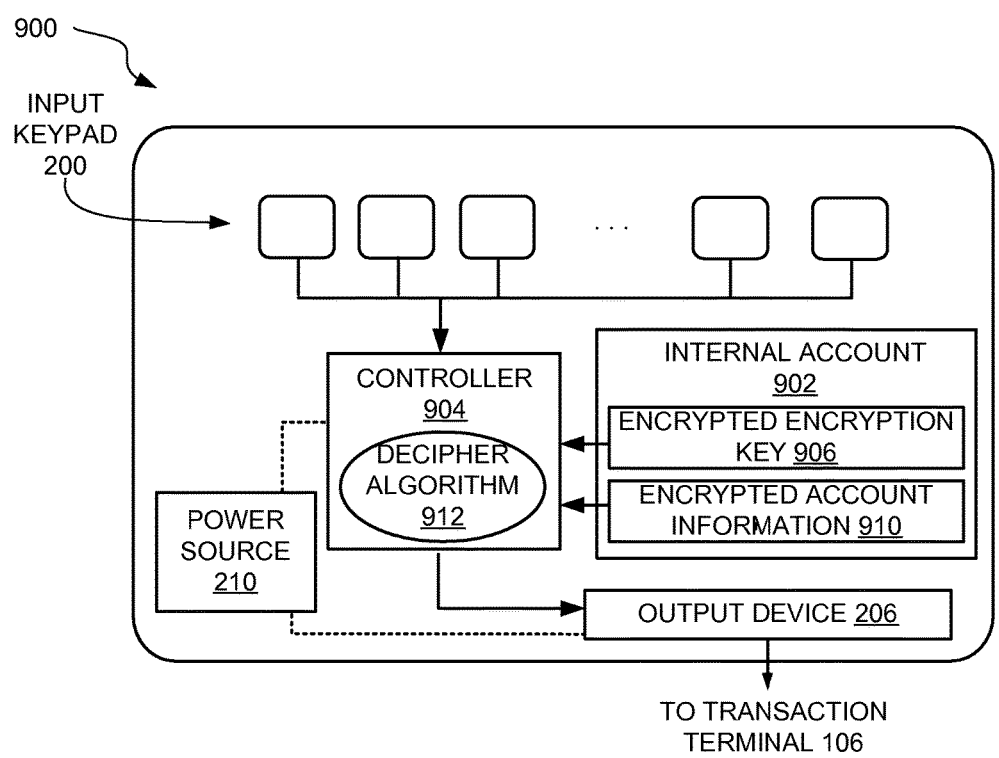
FIG. 9 shows a eighth embodiment of a self-authenticating credit card in which the account information is stored in an encrypted state.

Referring now to FIG. 9, therein is shown an eighth embodiment of a self-authenticating credit card 900 in which the account information 104 of FIG. 1 is stored in an encrypted state. This eighth embodiment has the advantage of creating a tamper-proof, self-authenticating credit card. Even if the account information 104 were extracted by some means, it cannot be interpreted.

The account information 104 in an internal account memory 902 is deciphered in the following steps:

1. The user inputs a PIN into the input keypad 200.
2. The input PIN is used by a controller 904 to decipher an encryption key 906 in the internal account memory 902.
3. Encrypted account information 910 is then read by the controller 904.
4. The encrypted account information 910 is then deciphered using the encryption key 906 as a decipher algorithm 912.
5. The deciphered account information 104 is then sent to the output device 206.
6. The account information 104, in its clear text state, is sent to the transaction terminal 106.

Figure 10:
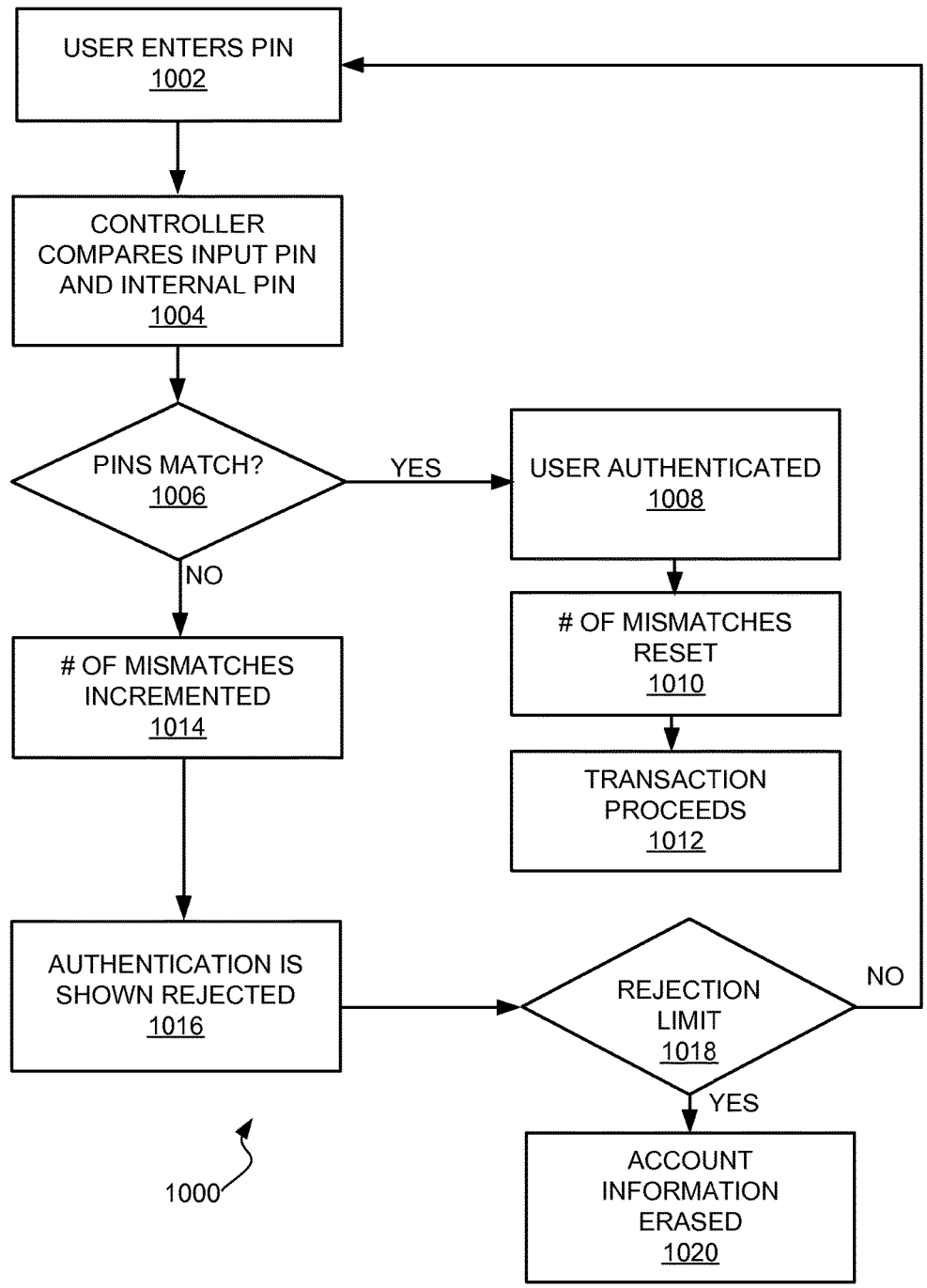
FIG. 10 shows a method to foil attempts to gain unauthorized access to account information.

Referring now to FIG. 10, therein is shown a method 1000 to foil attempts to gain unauthorized access to account information. This method 1000 keeps track of the number of failed authorization attempts. If the number of incorrect PIN entries exceeds a predetermined number, internal account information is erased and the credit card is deactivated.

The method 1000 starts when a user enters a PIN in block 1002 in a self-authenticating credit card. The controller compares the input PIN and the internal PIN in a block 1004.

If the input PIN and the internal PIN match in a PINS match decision block 1006, the user is authenticated in a block 1008 and the number of mismatches reset in a block 1010 to zero. The transaction proceeds in a block 1012.

If the input PIN and the internal PIN do not match, the number of mismatches is incremented in a block 1014 and the authentication is shown rejected in a block 1016. It is then determined if the maximum number of mismatches has been reached in a rejection limit decision block 1018.

If the rejection limit has not been reached, the method allows input of another PIN in the user enters a PIN in block 1002.

If the rejection limit has been reached, the account information is erased in a block 1020.

Figure 11:
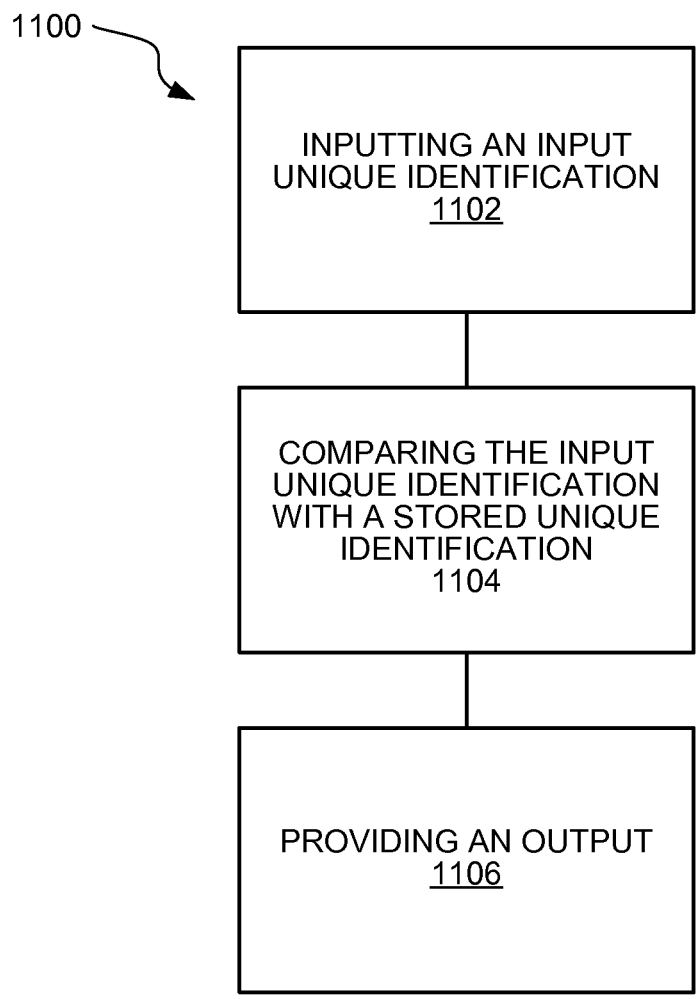
FIG. 11 shows a flow chart of a self-authenticating credit card method used with the self-authenticating credit card system in accordance with an embodiment of the present invention.

Referring now to FIG. 11, therein is shown a flow chart of a self-authenticating credit card method 1100 used with the self-authenticating credit card system 100 in accordance with an embodiment of the present invention. The self-authenticating card method 1100 includes: inputting an input unique identification to an input device on a credit card in a block 1102; comparing the input unique identification with a stored unique identification stored within the credit card in a block 1104; and providing an output from the credit card when the input unique identification matches the stored unique identification stored within the credit card in a block 1106. In summary, the problems of credit card fraud can be minimized in accordance with the principles of the present invention by providing an self-authenticating credit card that includes a keypad for inputting alphanumeric and other information, a processor for controlling the operation of the self-authenticating credit card, a battery or other power source for providing electrical power, and a output module for sending account information to a transaction terminal.

An self-authenticating credit card includes: an input device; a power source; an output device; an internally stored PIN; account data; and a processing unit coupled to the input device, output device, and power source, wherein the processor causes the output device to transmit account information when the processor determines that a correct Personal Identification Number has been entered with the input mechanism.

A self-authenticating credit card is disclosed wherein the credit card is approximately the same size as a conventional credit card.

A self-authenticating credit card is disclosed wherein the credit card is configured as a key fob or other shape. It may also be integrated into a cell phone, personal digital assistant, iPod®, music player, Flash memory device, or other hand-holdable personal device. The term "credit card" is used as a functional description rather than as a shape or implementation limiting description.

A self-authenticating credit card is disclosed wherein the internally stored PIN is user configurable.

A self-authenticating credit card is disclosed wherein the internally stored PIN is fixed.

A self-authenticating credit card is disclosed wherein the input mechanism comprises a membrane keypad.

A self-authenticating credit card is disclosed wherein the input mechanism comprises a series of optical detectors.

A self-authenticating credit card is disclosed wherein the input mechanism comprises a rotating thumb-wheel.

A self-authenticating credit card is disclosed wherein the processor comprises a micro-controller.

A self-authenticating credit card is disclosed wherein the power source is a battery.

A self-authenticating credit card is disclosed wherein the power source is a rechargeable battery.

A self-authenticating credit card is disclosed wherein the power source is an inductively coupled to the transaction terminal.

A self-authenticating credit card is disclosed wherein the power source is provided electrically from the transaction terminal.

A self-authenticating credit card is disclosed wherein the power source converts light energy to electrical energy.

A self-authenticating credit card is disclosed wherein the output device is an RF transmitter providing a wireless connection with the transaction terminal.

A self-authenticating credit card is disclosed wherein the output device is a connector providing a wired connection with the transaction terminal.

A self-authenticating credit card is disclosed wherein the components are protected from tampering using a potting compound to hinder disassembly.

A self-authenticating credit card is disclosed wherein the PIN is made unreadable by storing it internal to the processing unit and securing the processing unit's internal memory from external access by test and measurement equipment.

A self-authenticating credit card is disclosed wherein the controller and transmitter are provided in a single package.

A self-authenticating credit card is disclosed wherein its memory is able to hold purchase history and activation log.

A method of minimizing credit card fraud includes: receiving a PIN from an input device; and comparing received PIN to one stored internally; activating, for a predetermined time, the output device when received PIN matches PIN stored internally.

A method is disclosed wherein the output device sends account information to the transaction terminal.

A method is disclosed wherein the card remains active for a predetermined time to allow the output device to transmit account information when the transaction terminal requests it.

A method is disclosed including: allowing a user a limited number of attempts to input a correct PIN; and deactivating the credit card if the user fails to enter a matching PIN after a limited number of failed attempts.

An self-authenticating credit card includes: an input device; a power source; an output device; an internally stored PIN; a display device; and a processing unit coupled to the input device, output device, display device, and power source, wherein the processor causes the output device to transmit account information when the processor determines that a correct Personal Identification Number has been entered with the input mechanism.

A self-authenticating credit card is disclosed wherein the display device is used to show account information when the user has been authenticated.

A self-authenticating credit card is disclosed wherein the display device is used to display transaction status.

A self-authenticating credit card is disclosed wherein the display device is used to show locked and unlocked status.

A self-authenticating credit card is disclosed wherein the display is capable of displaying a barcode representing account information.

A self-authenticating credit card comprising: an input device; a power source; an output device; an encryption key; account data; and a processing unit coupled to the input device, output device, and power source, wherein the processor causes the output device to transmit account information when the processor determines that a correct PIN has been entered with the input mechanism.

A self-authenticating credit card is disclosed wherein the externally stored PIN is encrypted.

A self-authenticating credit card is disclosed wherein an encryption key is stored internally to the processor is used to decrypt externally stored account data.

A self-authenticating credit card is disclosed wherein a user PIN is used to generate a key for decrypting account data.

Yet another important aspect of the present invention is that it valuably supports and services the historical trend of reducing costs, simplifying systems, and increasing performance.

These and other valuable aspects of the present invention consequently further the state of the technology to at least the next level.

The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method, for using a self-authenticating credit card with a transaction terminal, comprising:
   storing an encrypted account information and an encrypted encryption key within a credit card, the encryption of the account information performed with the encryption key, wherein the encryption key in clear form is not stored in the self-authenticating credit card;
   receiving, by an input device on the credit card after the encrypted account information is stored in the credit card, an input unique identification;
   deciphering, by a processor of the credit card, the encrypted encryption key with the input unique identification to obtain the encryption key when the input unique identification is correct;
   deciphering, by the processor of the credit card, the encrypted account information with the obtained encryption key to obtain the account information; and
   providing, by the processor of the credit card, the account information as an output from the credit card based on the deciphering of the encrypted account information, wherein the account information includes a credit card number and the account information remains hidden until the encrypted account information is deciphered with the encryption key.

2. The method as claimed in claim 1, wherein providing the account information as an output further comprises:
   transmitting, from the credit card, the account information output to the transaction terminal for conducting a credit card transaction.

3. The method as claimed in claim 1, further comprising:
   receiving the account information output in the transaction terminal;
   sending, by the transaction terminal, the account information output for approval or rejection of the credit card; and
   receiving approval or rejection of the credit card by the transaction terminal.

4. The method as claimed in claim 1, further comprising:
   erasing the encrypted account information in the credit card after a predetermined number of incorrect input unique identification entries.

5. The method as claimed in claim 1, further comprising:
   before storing the encrypted account information within the credit card, encrypting, by the processor of the credit card, the account information using the encryption key.

6. The method as claimed in claim 1, further comprising:
   storing or outputting information including purchase history, an activation log, or a combination thereof.

7. The method as claimed in claim 1, further comprising:
   displaying, by the credit card, credit card information including the account information, credit card status, a barcode output, or a combination thereof.

8. The method as claimed in claim 1, further comprising:
   powering the credit card from an internal battery, an inductance source, a photovoltaic source, an electrical source, or a combination thereof.

9. The method as claimed in claim 1, wherein providing the account information output further includes:
   transmitting the account information output by contact transmission, wirelessly transmission, or a combination thereof.

10. A credit card for use with a transaction terminal, the credit card comprising:
    an internal memory storing an encrypted account information and an encrypted encryption key;
    an input device for receiving an input unique identification on the credit card after the encrypted account information is stored in the internal memory;
    a processor for deciphering the encrypted encryption key with the input unique identification to obtain the encryption key when the input unique identification is correct and for deciphering the encrypted account information with the obtained encryption key to obtain the account information; and
    an output device for transmitting the account information as an output from the credit card to the transaction terminal based on the deciphering of the encrypted account information, wherein the account information includes a credit card number and the account information remains hidden until the encrypted account information is deciphered with the encryption key.

11. The credit card as claimed in claim 10, wherein the output device transmits to the transaction terminal the account information for conducting a credit card transaction.

12. The credit card as claimed in claim 10, wherein the transaction terminal receives the account information output and sends the account information for approval or rejection of the credit card, wherein a transaction approval system returns approval or rejection of the credit card to the transaction terminal.

13. The credit card as claimed in claim 10, wherein the processor erases the encrypted account information in the credit card after a predetermined number of incorrect input unique identification entries.

14. The credit card as claimed in claim 10, wherein the processor encrypts, before the encrypted account information is stored within the credit card, the account information using the encryption key.

15. The credit card as claimed in claim 10, wherein the internal memory is configured for storing information including purchase history, an activation log, or a combination thereof.

16. The credit card as claimed in claim 10, further comprising:

a display for displaying credit card information including the account information, credit card status, a barcode output, or a combination thereof.

17. The credit card as claimed in claim 10, further comprising:

circuitry for fixing the stored encrypted encryption key within the credit card.

18. The credit card as claimed in claim 10, further comprising:

circuitry for powering the credit card from an internal battery, an inductance source, a photovoltaic source, an internal power source, or a combination thereof.

19. The credit card as claimed in claim 10, wherein the output device includes circuitry for transmitting the account information output by contact transmission, wirelessly transmission, or a combination thereof.

* * * * *